(12) United States Patent  (10) Patent No.: US 7,729,848 B2
Götzenberger  (45) Date of Patent: Jun. 1, 2010

(54) DEVICE FOR CHARGING AND DISCHARGING AT LEAST ONE PIEZOACTUATOR FOR AN INJECTION VALVE OF AN INTERNAL COMBUSTION ENGINE

(75) Inventor: Martin Götzenberger, Ingolstadt (DE)

(73) Assignee: VDO Automotive AG, Munich (DE)

( * ) Notice: Subject to any disclaimer, the term of this patent is extended or adjusted under 35 U.S.C. 154(b) by 281 days.

(21) Appl. No.: 11/995,897

(22) PCT Filed: Jun. 29, 2006

(86) PCT No.: PCT/EP2006/063679

§ 371 (c)(1),
(2), (4) Date: Jan. 16, 2008

(87) PCT Pub. No.: WO2007/009862

PCT Pub. Date: Jan. 25, 2007

(65) Prior Publication Data

US 2008/0202475 A1 Aug. 28, 2008

(30) Foreign Application Priority Data

Jul. 19, 2005 (DE) ........................ 10 2005 033 708

(51) Int. Cl.
*G06F 19/00* (2006.01)
*F02M 51/00* (2006.01)
*H01L 41/09* (2006.01)

(52) U.S. Cl. ........................ 701/114; 123/479; 123/490; 310/316.03; 310/317

(58) Field of Classification Search ................ 123/478, 123/479, 490; 701/103–105, 114, 115; 310/316.01, 310/316.02, 316.03, 317
See application file for complete search history.

(56) References Cited

U.S. PATENT DOCUMENTS

| 5,013,955 | A | * | 5/1991 | Hara et al. | 310/323.21 |
| 5,097,171 | A | * | 3/1992 | Matsunaga et al. | 310/316.01 |
| 5,479,062 | A | * | 12/1995 | Yoshino | 310/316.03 |
| 6,078,198 | A | | 6/2000 | Gerken et al. | |
| 6,236,190 | B1 | * | 5/2001 | Hoffmann et al. | 310/317 |
| 6,333,585 | B1 | | 12/2001 | Hoffmann et al. | |
| 6,486,587 | B2 | * | 11/2002 | Klenk et al. | 310/316.03 |

(Continued)

FOREIGN PATENT DOCUMENTS

DE 197 09 717 C1 9/1998

(Continued)

*Primary Examiner*—Willis R Wolfe, Jr.
(74) *Attorney, Agent, or Firm*—Laurence A. Greenberg; Werner H. Stemer; Ralph E. Locher

(57) ABSTRACT

A device for controlling at least one piezoactuator for an injection valve of an internal combustion engine, including a microcontroller that controls an output stage which generates the load current for charging and discharging the piezoactuator. The microcontroller controls the output stage through an integrated circuit. A discharge circuit interacts with the integrated circuit to reliably discharge the piezoactuator in case of a failure of the output stage and/or of a safety path of the microcontroller. The load current during the discharge is controlled by a control circuit having a controller which is part of the integrated circuit. The discharge circuit has emergency discharge elements that are activated in case of a failure of the controller or of the integrated circuit.

8 Claims, 1 Drawing Sheet

U.S. PATENT DOCUMENTS

| | | |
|---|---|---|
| 7,455,051 B2 * | 11/2008 | Gotzenberger .............. 310/317 |
| 2002/0121958 A1 | 9/2002 | Schrod |
| 2003/0099071 A1 | 5/2003 | Reineke et al. |
| 2003/0205949 A1 | 11/2003 | Rueger et al. |

FOREIGN PATENT DOCUMENTS

| | | | |
|---|---|---|---|
| DE | 198 14 594 A1 | 10/1999 | |
| DE | 198 43 621 A1 | 4/2000 | |
| DE | 198 54 306 A1 | 6/2000 | |
| DE | 199 44 733 A1 | 3/2001 | |
| DE | 199 52 950 A1 | 6/2001 | |
| DE | 101 14 421 A1 | 10/2002 | |
| DE | 101 52 270 A1 | 5/2003 | |
| DE | 101 52 273 A1 | 5/2003 | |
| DE | 101 55 388 A1 | 5/2003 | |
| EP | 1 139 443 A1 | 10/2001 | |
| EP | 1 312 785 A2 | 5/2003 | |
| FR | 2 831 271 | 5/2003 | |
| JP | 01202177 A * | 8/1989 | ................. 310/317 |
| WO | 01/33061 A1 | 5/2001 | |

* cited by examiner

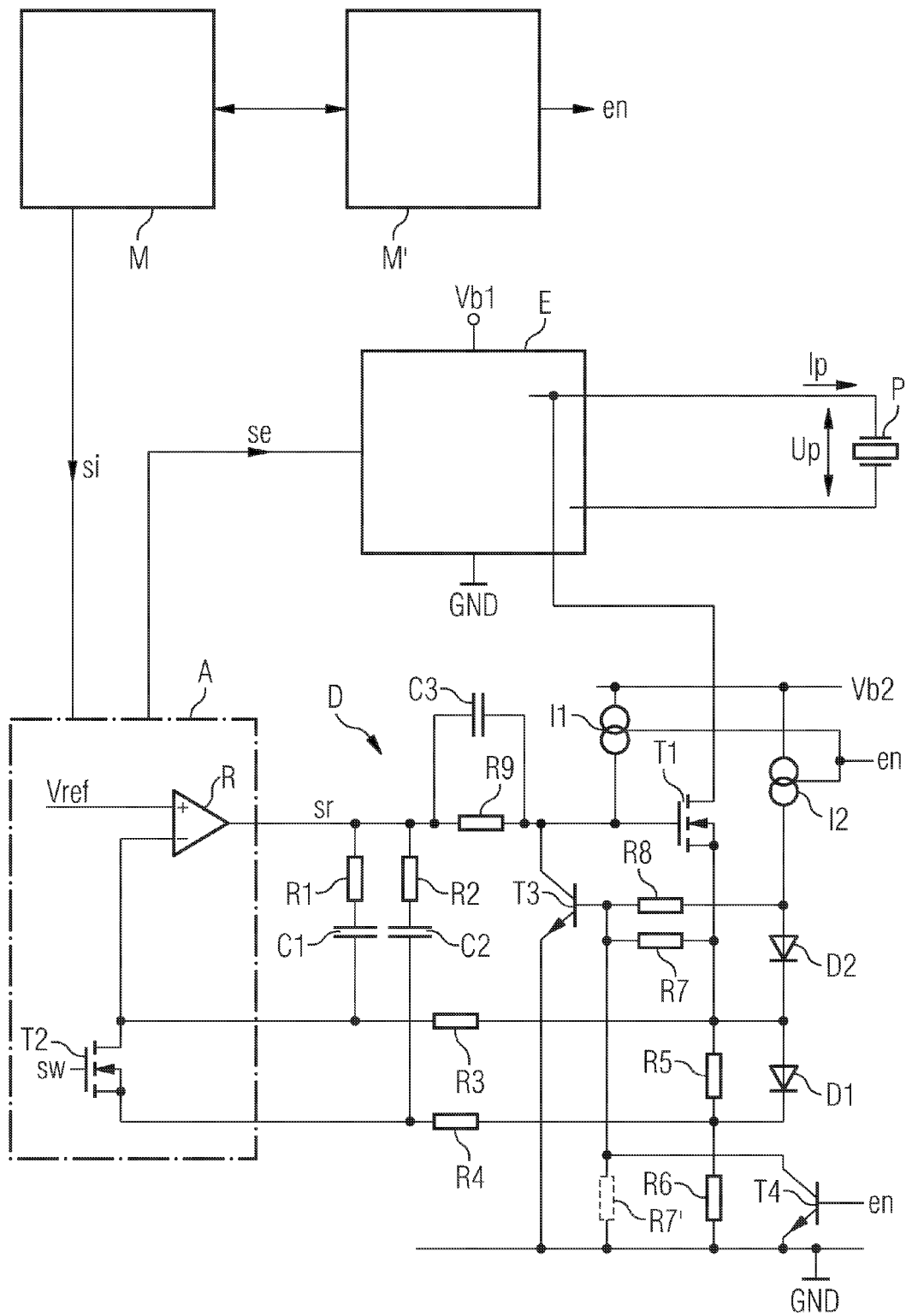

DEVICE FOR CHARGING AND DISCHARGING AT LEAST ONE PIEZOACTUATOR FOR AN INJECTION VALVE OF AN INTERNAL COMBUSTION ENGINE

BACKGROUND OF THE INVENTION

Field of the Invention

The present invention relates to the actuation (charging and discharging) of at least one piezo-actuator for an injection valve of an internal combustion engine.

Devices of this type are known, and generally incorporate an output stage linked to the piezo-actuator, for the purpose of generating a load current for charging and discharging the piezo-actuator on the basis of a control signal input to the output stage. In respect of the circuit technology for realizing such an output stage refer, solely by way of example, to DE 199 44 733 Al, DE 198 14 594 Al and DE 199 52 950 Al.

Also known is the use of a microcontroller to realize the provision of the control signal for the output stage. The background to this is as follows: in modern vehicles, diverse control and/or monitoring functions for electronic or electrical components of the vehicle are, on grounds of cost efficiency, generally combined into one or more electronic assembly, each referred to as a "controller". The demands to be met, in terms of the functionalities of such controllers, have risen steadily, with the result that nowadays the desired functions are for the most part implemented by the use of a micro-controller contained in the controller. Here, the term "micro-controller" refers, for example, to an electronic program-controlled control device which typically has, like a PC, a CPU, a RAM, a ROM and I/O ports, but unlike a PC is arranged for a very special application. Alternatively, a micro-controller can also be implemented by an electronic component which is permanently-wired or application-specifically configurable (e.g. an ASIC, FPGA etc.).

Although it is therefore expedient to use a micro-controller for the operation of the injection system for the internal combustion engine, there does however remain the problem in principle that the injection valves of an internal combustion engine represent a safety-critical component for which there must in practice be a "safety path" which is independent of the micro-controller, via which each piezo-actuator can be brought to a non-safety-critical state. As a rule, such a non-safety-critical state is produced by discharging the piezo-actuator.

BRIEF SUMMARY OF THE INVENTION

It is one objective of the present invention to realize a device of the type mentioned in the introduction in a way that is particularly cost-effective and yet operationally safe.

This objective is achieved with a device as claimed in claim 1. The dependent claims relate to advantageous developments of the invention.

A first essential aspect of the invention is the use of a microcontroller for actuating the output stage which, in turn, generates the load current for charging and discharging the piezo-actuator. This gives the advantages which are already known from the prior art. Here it is possible to use in particular as the micro-controller a (universal) "microcontroller type" (chip) which is suitable for a wide variety of purposes.

A further important aspect of the invention consists in the fact that the micro-controller does not actuate the output stage directly, but via an integrated circuit which is provided separately for the purpose. Using this integrated circuit it is possible cost-effectively to match the output signals from the microcontroller to a certain extent to the input-side requirements of the output stage, and/or to relieve the load on the micro-controller. In the case of the invention, the integrated circuit provides the control signal which is to be input to the output stage on the basis of an actuation trigger provided by the microcontroller. The integrated circuit is preferably in the form of an application-specifically configured integrated circuit (ASIC).

A further important aspect of the invention now consists in the provision of a discharge circuit, which is constructed in a particular way and interacts in a particular way with the integrated circuit, which serves to discharge the piezo-actuator in the event of a failure of the output stage and/or of the micro-controller ("safety path"). The special feature of this discharge circuit, supplied for example from an on-board vehicle voltage source, consists on the one hand in the fact that the load current which flows during this discharge is advantageously defined by a feedback control loop, the loop controller for which is contained in the integrated circuit and thus is realized very cost-effectively and with very precise operation. Another special feature of the discharge circuit consists in the fact that the tendency for the failure probability to be increased, due to the "insertion" of the integrated circuit between the microcontroller and the output stage (i.e. by a failure of precisely this integrated circuit) is taken into account or handled, as appropriate, by facilities (emergency discharge facilities) inherent in the discharge circuit. In accordance with the invention, the latter is realized with particular simplicity in terms of the circuit technology in that, in the event of such an emergency discharge (after a failure of the loop controller or the integrated circuit, as applicable), the one and same current setting element is used for adjusting the emergency discharge current as is also used by the discharge circuit for setting the discharge current after a microprocessor failure when the loop controller is working properly.

An advantageous application of the invention is, for example, in the operation of a "common rail" injection system.

Although the invention is basically suitable for output stages of any arbitrary circuit concept, the combination of micro-controller and integrated circuit, which can in principle be very powerfully configured, permits in particular the provision of control signals for clocked output stages. Here, the term "clocked output stage" refers to a circuit concept in which each charge or discharge operation of the piezo-actuator is effected not by a load current which is provided continuously but as load current pulses, that is clocked.

In a preferred form of embodiment, provision is made that the integrated circuit forms part of a DC/DC converter which provides at its output a supply voltage for the output stage. This measure permits a further cost reduction for the total system, because an output stage of the type which is of interest here must typically provide voltages in the region of up to several 100 V and brief load currents of more than 10 A for charging and discharging the piezo-actuator, for which purpose an upward conversion is typically provided in a vehicle from the rather low on-board vehicle supply voltage (e.g. 12 V) to a voltage which is usable for supplying the output stage. It is possible, as part of the invention, to implement at least some of the components (in particular for example feedback control or stabilization components, as appropriate) of such a DC/DC converter in the integrated circuit for practically no additional cost. It is then possible to build on, in discrete form, for example, merely such remaining power components as an output stage for the DC/DC converter.

In a preferred form of embodiment, provision is made that the output signal from the control loop is routed to the control input on the current setting element via a passive filter with high-pass characteristics. This then has the particular advantage that in the event of a failure of the control loop or the integrated circuit, as applicable, the passive filter to some extent isolates the control input on the current setting element from the faulty control loop output signal. This at least in the case when the faulty signal concerned is relatively low frequency in relation to the high-pass characteristics. However, in practice this is generally the case, for example in the event of a short circuit which causes an incorrectly constant control loop output signal. Due to the load current feedback control applied in doing so, the discharge of the piezo-actuator, managed by means of the discharge circuit, can be effected very rapidly but nevertheless with a controlled load current which is not excessively large. The quality of the load current trigger depends, among other things, on the accuracy with which the load current actual value is sensed. In one form of embodiment, provision is made that the discharge circuit has a current measurement shunt arrangement, connected in series with the current setting device, from which the load current actual value can be tapped off as a voltage drop. With this, it is possible to determine the load current actual value in a particularly simple manner.

In practice, there is a problem in determining the load current actual value as a voltage drop across a current measurement resistance, in that for a resistance value which is expediently chosen as low as possible (because of the low power loss) the voltage drop is also correspondingly small and thus tends to be not accurately measurable. This last inaccuracy is the more serious the smaller is the load current that is actually flowing. Hence if a single current measurement resistance is used allowance must be made for a large measurement inaccuracy at the end of the discharge operation. Particularly to eliminate this problem, a development is provided in which the current measurement shunt arrangement has several current measurement resistances arranged in series with one another and connected in parallel with at least one of these resistances is a diode polarized to allow the current to pass. It is thereby possible to ensure high current measurement accuracy across a larger range of load currents. For example, one of the current measurement resistances can have a comparatively small resistance so that at a high load current, such as flows at the start of the discharge for example, a voltage drop arises which is well usable for the measurement. Another current measurement resistance can have a resistance value which by comparison is significantly larger, so that the measurement voltage drop across it can still be measured well at small load currents, such as flow at the end of the discharge operation, for example. A diode connected in parallel with the resistance with the large resistance value can reduce the losses at large load currents.

A prescribed load current profile is also of advantage for the discharge of the piezo-actuator, managed by the emergency discharge facilities. In one form of embodiment, provision is made for example that the emergency discharge facilities are designed for discharging the piezo-actuator at a constant current.

In order to provide a prescribed load current profile for the emergency discharge facilities, in particular for example a constant load current, feedback control can again be provided for the load current. In a form of embodiment which is preferred in relation to this, provision is made that the emergency discharge facilities form a feedback control loop which, using the current setting element and the current measurement shunt arrangement, regulates the emergency discharge current. This has the advantage of a double usage of both the current setting element and also the current measurement shunt arrangement, namely both in the case of the discharge normally provided by the discharge circuit (with a functioning control loop), and also in the case of the emergency discharge (after a failure of the control loop contained in the integrated circuit).

A particularly reliable emergency discharge can be ensured, for example, by incorporating into the emergency discharge facilities a current source for supplying a constant current to the control input on the current setting element together with a current sink, for diverting a current from the control input on the current setting element, having a controlled current diversion capacity. The constant current source used for supplying the control input on the current setting element (realized, for example, by a transistor arrangement) can be activated, for example, by a control signal which indicates the failure of the control loop contained in the integrated circuit or of the integrated circuit as a whole, as applicable. The emergency discharge facilities thus formed can provide the emergency discharge current regulation mentioned above, in that the current diversion capacity of the current sink is controlled as a function of the measured load current actual value.

In one form of embodiment, provision is made for constructing at least a large proportion of the discharge circuit from discrete electronic components. For example, a power transistor for which the base or the gate, as appropriate, then represents the control input, is suitable as the current setting element. If a passive filter is provided between the control loop of the integrated circuit and the control input it can, in the simplest case, incorporate or consist of a capacitor and a resistance connected in parallel.

In a preferred form of embodiment, the device incorporates in addition another micro-controller, which serves as a "safety processor", which in normal operation undertakes no control functions worth mentioning, but essentially only monitors the normal operation and, if it detects malfunctions, takes suitable safety measures.

Such a safety processor can, for example, be used to monitor the orderly operation of the microcontroller and/or the integrated circuit and/or the output stage, in order to output appropriate fault signals if faults are detected, for example a fault signal which indicates the failure of the output stage and/or of the micro-controller and is input to the discharge circuit, to initiate the discharge operation carried out by the latter. In addition, the safety processor can output to the emergency discharge facilities (to activate them) a fault signal indicating the failure of the control loop contained in the integrated circuit.

The invention is described in more detail below by reference to an exemplary embodiment, with reference to the attached drawing. This shows:

BRIEF DESCRIPTION OF THE SINGLE VIEW OF THE DRAWING

FIG. 1 is a block diagram of a device for charging and discharging at least one piezo-actuator.

DESCRIPTION OF THE INVENTION

FIG. 1 shows the components, which are important for an understanding of the present invention, of a circuit arrangement which is contained in a so-called controller in a motor vehicle and which, among other functions, is used to actuate a plurality of piezo-actuators in a fuel injection system.

For the sake of simplicity in the diagram, the figure shows only one of the piezo-actuators, marked P, each of which in the operation of the internal combustion engine is driven at injection intervals by the application of a suitable actuation voltage Up or by the supply of an actuation current Ip (the load current) from an output stage E provided for this purpose. For the purpose of supplying the output stage E, it is connected on the one side to a vehicle electrical ground GND (0 V) and on the other side to a first supply potential VbI (e.g. +200 V), and it generates the load current Ip for charging and discharging the piezo-actuator P on the basis of a control signal se input to the output stage E.

The output stage E is a clock-pulse driven output stage which, before each charge operation or discharge operation, as applicable, selects one of the multiplicity of piezo-actuators by means of a selection switch provided for each piezo-actuator, and then charges or discharges it, as applicable, by a series of short load current pulses.

In doing this, the control signal se is provided by an integrated circuit A in the form of an ASIC (application-specifically-configured integrated circuit), on the basis of an actuation signal si input to said integrated circuit A.

The actuation trigger si is provided by a microcontroller M under software control to an I/O port on it.

The controller's microcontroller M fulfills in addition numerous other functions which are here of no interest in relation to the actuation of electrical or electronic components of the vehicle. A second microcontroller or "safety processor" M', which has a communication link to the microcontroller, monitors the orderly operation of the microcontroller M together with all the other components of the device shown in FIG. 1.

In a way which is known per se, software which is executed in the micro-controller M carries out regulation of the injection quantity on the basis of various parameters which are captured, in particular are measured or calculated (driver's wishes, engine operating parameters etc.).

To a certain extent, the integrated circuit A forms an intermediate link, which can be cost-effectively realized, between the micro-controller chip M of a conventional commercially obtainable type and the relevant output stage E. In practice, therefore, it is possible to use the one and same type of microcontroller for various embodiments of the internal combustion engine or embodiments of the injection system, as applicable.

Also to be seen in the figure is a discharge circuit D, which is linked to the piezo-actuator P and to the integrated circuit A and is mainly of discrete construction, which serves the purpose of enabling the piezo-actuator P to be discharged even in the event of a failure of the output stage E and/or of the micro-controller M. This function is often referred to in practice as the "safety path", because the piezo-driven injection valve represents a safety-critical component of the vehicle, which in the event of a failure must be put into a non-safety-critical state.

The discharge circuit D incorporates a current setting transistor T1 (the "protection switch") for setting a load current Ip which is to flow during this safety discharge. Here, the current setting transistor T1 takes the form of an FET, from which one channel connection is connected to a live connection ("hot side") on the piezo-actuator P, whereas the other channel connection is connected via a current measuring shunt device R5, R6 to the vehicle's electrical ground GND. In the exemplary embodiment illustrated, the current measuring device consists of two current measuring resistances R5 and R6 connected in series, across each of which there is a voltage drop which is proportional to the load current Ip flowing during the safety discharge. However, this only applies to a limited extent for the resistance R5 because connected in parallel with this resistance is a diode D1 polarized to allow current to pass. For larger load currents Ip, this diode D1 thus takes an increasingly larger proportion of the current flowing through the parallel circuit R5, D1. This advantageously reduces the electrical power loss at higher load currents.

A controlled load current profile is realized by means of the discharge circuit D. For this purpose, a control loop R (here: an operational amplifier with external negative feedback or compensation, as appropriate, through resistances R1, R2 and capacitances C1 and C2) contained in the integrated circuit A compares an actual value of the load current Ip with a setpoint value for this load current Ip, and at its output sets a control error signal sr which is characteristic of the deviation between the actual value and the setpoint value. In order to close the feedback control loop, this control error signal sr is fed to the gate of the current setting transistor T1 via a passive filter with high-pass characteristics, namely a resistance R9 and a capacitance C3 connected in parallel.

The reference variable for this feedback control loop, which defines the desired discharge current profile during a safety discharge, is here generated by the integrated circuit A as a reference potential Vref and is fed to the non-inverting input of the control loop R.

A further special feature of the feedback control loop shown consists in the fact that the feedback signal which is fed to the inverting input of the control loop R can be generated in two different feedback modes, between which there is a switchover at a time point in the course of the discharge. For this purpose a switchover signal sw, which is also generated by the integrated circuit A, is applied to the gate of a transistor T2 which is provided for this switchover.

At the start of the discharge, the switchover signal sw is chosen so that the switchover transistor T2 is conducting. In this first phase, the current measuring signal, which appears as the weighted sum of the voltage drops across the current measurement paths R5, D1 and R6, is fed to the control loop R via a feedback network R1, R2, C1, C2, R3, R4. In a second phase (T2 blocking), which is initiated by the resetting of the signal sw, the feedback path which passes through R4 is then deactivated. The feedback resistance R4 is sized to have a significantly smaller resistance value than the feedback resistance R3. The load current Ip which flows in the second phase (up to the end of the discharge operation) is comparatively low.

The integration of the control loop R for the power controller T1 into the integrated circuit A is very advantageous both on cost grounds and also on grounds of the accuracy and stability of the discharge current regulation. As a deviation from the exemplary embodiment illustrated it is conceivable in principle for yet further components of the discharge circuit D shown to implemented within the integrated circuit A rather than discretely.

The arrangement, which is very advantageous per se, of the integrated circuit A with a dual function, namely on the one hand for relieving the load on the micro-controller M and for matching the latter to the output stage E concerned, and on the other hand to form a part of the discharge circuit D required for the safety discharge, does also however have a disadvantage in principle, which is recognized by the applicant, namely that it increases the danger of a failure of the safety discharge because it uses the integrated circuit A. Specifically if a malfunction occurs, in the region of this integrated circuit A, which has a detrimental effect on the regulation components described (in particular for example the control loop R fails), then an erroneous control error signal sr can be generated at the output from the control loop R. However, this problem is advantageously eliminated by the further special feature of the discharge circuit D which is described below.

The output signal sr from the control loop R is fed to the gate of the current setting transistor T1 via a relatively high resistance (through R9). This means that the DC path from the output from the control loop R to the transistor T1 is to a large extend interrupted, so that this same transistor T1 remains nevertheless, in the way described below, usable for an "emergency discharge" even in the event of a faulty response of the control loop R or of the integrated circuit A, as applicable. The capacitor C3 which is connected in parallel with the transfer resistance R9 ensures there is a normal transfer function in the usual frequency range, whereas R9 handles a voltage which is on average zero across C3.

For the purpose of eliminating the problems associated with the failure of the control loop R, the discharge circuit D has emergency discharge facilities, for application to the gate of the current setting transistor T1 for an emergency discharge of the piezo-actuator P.

The emergency discharge facilities are formed by the following components: first connections on two current sources I1 and I2 which can be activated by an emergency discharge release signal en are connected to a positive supply potential Vb2 (e.g. 12 V) of the discharge circuit D. The other connection on the first current source I1 is connected to the gate of the current setting transistor T1. The other connection on the second current source I2 is connected on the one hand to the base of a transistor T3 via a resistance R8, and on the other hand to the anode of a diode D2. The collector of transistor T3 is connected to the gate of the current setting transistor T1 and the emitter of transistor T3 is connected to the electrical ground GND. The cathode of diode D2 is connected on the one hand to a circuit node between the transistor T1 and the current measurement arrangement R5, R6 and on the other hand to the anode of diode D1. The cathode of diode D1 is connected to a circuit node between the two current measurement resistances R5 and R6. A resistance R7 is connected on the one had to the base of transistor T3 and on the other hand to a circuit node between the current setting transistor T1 and the current measurement arrangement R5, R6. The base of transistor T3 is also connected to the collector of a transistor T4, the emitter of which is connected to the electrical ground GND and the base of which, like the current sources I1, I2, has the emergency discharge release signal en fed to it.

The functioning of the emergency discharge facilities is as follows: in normal operation, if the integrated circuit A and, in particular, its control loop R is working properly, T4 is conducting so that T3 is securely blocked and the regulation which is effected by means of the control loop R is essentially unaffected. However if a failure is detected for the control loop R or the integrated circuit A, as applicable, which in the exemplary embodiment shown would be effected by the safety processor M', then the signal en which indicates this failure situation is passed to the control inputs on the current sources I1 and I2 and to the base of transistor T4, which is thereby put into the blocking state. The output signal from the control loop R has practically no effect on the current setting transistor T1 because of the high-pass filter C3, R9 in circuit between them. However, the potential at the gate of this transistor T1 is shifted, by the current provided from the current source I1, in such a way that T1 starts to conduct. An emergency discharge current then flows from the piezo-actuator P through the current setting transistor T1 and the current measurement resistors R5 and R6 to ground GND. However, this discharge current is advantageously limited, or to be more precise is regulated, in that the voltage drop across the current measurement arrangement R5, R6 is applied via the resistance R7 and the series circuit comprising D2 and R8 to the base of the transistor T3, and therefore a certain proportion of the current fed to the gate of T1 is diverted via the transistor T3, again to ground GND. The circuitry shown has the effect of setting a predefined constant emergency discharge current. Here, in conjunction with the diode D2, the current source I2 which is activated in this case advantageously effects an upward shift in the potential produced by the discharge current at the current measurement arrangement R5, R6. This potential, raised by the voltage drop at D2, is fed via the resistance R8 to the base of the transistor T3, which can thereby be reliably actuated as part of the emergency discharge current control. This applies in particular for a voltage drop across R5, R6, at which the diode D1 does not yet conduct. In the steady state situation, the transistor T3 draws exactly as much current from the gate of the current setting transistor T1 as is fed to it by the current source I1.

The additional safety path inherent in the discharge circuit, created by the emergency discharge facilities, makes the use of safety discharge regulation components (here: the control loop R) within the integrated circuit A particularly reliable in operation.

It is advantageous that in the exemplary embodiment illustrated this additional "emergency safety path" makes shared use of components of the safety discharge arrangement provided in any case for normal operation (the current setting transistor T1 and current measurement arrangement R5, R6).

Of course, the circuitry shown can be modified and still retain its particular advantages. It is for example possible, as a deviation from the exemplary embodiment illustrated, to connect the resistance R7, which is connected to the base of the transistor T3, down to ground GND, as sketched in the figure at R7'.

The invention claimed is:

1. A device for charging and discharging at least one piezo-actuator for an injection valve in an internal combustion engine, comprising:
   an output stage connected to said piezo-actuator for generating a load current for charging and discharging said piezo-actuator as a function of a control signal input to said output stage;
   an integrated circuit connected to said output stage for providing the control signal as a function of an actuation signal input to said integrated circuit, said integrated circuit including a control loop;
   a microcontroller connected to said integrated circuit for providing the actuation signal; and
   an emergency discharge circuit connected to said piezo-actuator and to said integrated circuit for discharging said piezo-actuator if at least one of said output stage and said micro-controller fails such that said piezo-actuator does not discharge, said emergency discharge circuit setting the load current which flows during discharge, having a current setting element, said control loop applying an output signal to said current setting element and comparing a load current actual value with a load current setpoint value and providing a control error signal as the output signal, and said emergency discharge circuit being activated if said control loop fails to apply the output signal to said current setting element, for emergency discharge of said piezo-actuator.

2. The device according to claim 1, wherein said integrated circuit is part of a DC/DC converter which provides an output supply voltage for said output stage.

3. The device according to claim 1, including a passive filter having high-pass characteristics, and the output signal is fed through said passive filter to said current setting element.

4. The device according to claim 1, wherein said emergency discharge circuit is configured to provide a constant current to discharge said piezo-actuator.

5. The device according to claim 1, wherein said emergency discharge circuit includes a current source to feed a constant current to said current setting element and a current sink, said current setting element and said current sink are connected to divert a proportion of current from said current setting element to said current sink.

6. The device according to claim 1, wherein said emergency discharge circuit includes a current measurement shunt connected in series with said current setting element, from which the load current actual value is determined as a voltage.

7. The device according to claim 6, wherein said current measurement shunt includes a plurality of resistors connected in series.

8. The device according to claim 6, wherein said emergency discharge circuit comprises a feedback control loop including said current setting element and said current measurement shunt regulate an emergency discharge current from said piezo-actuator.

* * * * *